United States Patent [19]

Crasnianski

[11] 4,159,783

[45] Jul. 3, 1979

[54] SELECTOR-DISPENSER OF FLAT KEY BLANKS

[75] Inventor: Serge Crasnianski, Grenoble, France

[73] Assignee: Kis-France, Grenoble, France

[21] Appl. No.: 835,172

[22] Filed: Sep. 20, 1977

[30] Foreign Application Priority Data

Oct. 1, 1976 [FR] France .................................. 76 29616

[51] Int. Cl.² ............................................. G07F 11/00
[52] U.S. Cl. ........................................ 221/13; 221/81;
221/120; 221/121; 221/129
[58] Field of Search ........................ 221/13, 77, 80, 81,
221/88, 120, 121, 123, 124, 129; 194/4, 10

[56] References Cited

U.S. PATENT DOCUMENTS 3,265,245   8/1966   Harden ................................. 221/124

*Primary Examiner*—Allen N. Knowles

*Attorney, Agent, or Firm*—Frishauf, Holtz, Goodman & Woodward

[57] ABSTRACT

A key blank selector-dispenser comprises a drum having a central axis aperture and several series of radial cells for receiving magazines of key blanks and contained in respective radial planes of the cylinder. The drum is rotatable by an electric motor having an electromagnetic brake. Key blank ejectors for each said series are provided in said aperture and are located in the same diametral plane of the drum.

A control panel has a number of slots for insertion of specimen keys equal to the number of said cells. Means actuatable by insertion of a specimen key closes the motor circuit to start the motor. A cam on each series of cells operates a limit contact when a cell having a desired blank comes into the plane of the ejectors to effect stopping of the motor and actuation of the ejector corresponding to the series selected.

15 Claims, 5 Drawing Figures

SELECTOR-DISPENSER OF FLAT KEY BLANKS

FIELD OF THE INVENTION

The present invention relates to apparatus for selecting and dispensing flat key blanks.

BACKGROUND OF THE INVENTION

It is well-known that it is often necessary to reproduce flat keys for numerous applications such as door keys, ignition keys for cars, keys for door locks, suitcases or various items of furniture, and there are at present automatic machines which make it possible very rapidly to reproduce profiles of specimen keys from blanks of suitable form. Indeed, the various flat keys are distinguished from one another not only by their profile but also by their length, their width and mainly by their cross-sectional form: the result is that the locksmith must have available a very large number of blanks of different types, from which he must find out the blank which is likely to be suitable for reproducing a specific specimen key. In order to facilitate the search, it has already been proposed to provide dispensers comprising magazine containers each containing blanks of a type which corresponds to a model of key of one maker (indeed, keys generally bear the name of either the car manufactures, or lock manufactures, and also a reference number or code), such magazines being provided with means of extracting or ejecting a blank, operated by a selector mechanism triggered by insertion of the specimen key into a template comprising slots, the cross-sectional form of which is identical to that of the specimen key. In principle, therefore, it is sufficient to designate the slots of the template by the trade mark (name of manufacturer and number) of the corresponding specimen key in order to obtain immediately the desired key or indeed, if the specimen does not bear the necessary information, to try to insert it successively into different slots in the template which at first sight are of similar form. However, the known dispensers of this type, whether they comprise magazines in the form of flat juxtaposed boxes each of which has an ejector device, or a rotatable structure having radial cells in which the blanks are stacked and which are, by rotation of the drum around its axis, automatically positioned opposite an extractor or ejector, are extremely cumbersome and mechanically complicated, which makes it impossible to provide therein a number of cells adequate to hold the majority of the types of blanks corresponding to the various existing model of keys, even those used most commonly in various applications.

SUMMARY OF THE INVENTION

The present invention relates to a selector-dispenser of the rotary magazine drum type for selection of the blank by insertion of the specimen key into a template, and makes it possible to allow the storage of a very large number of types of blanks, for example of the order of 500 or more, in a minimum of space due to the use of electrical means of selecting and ejecting a blank of the desired type.

The selector-dispenser according to the invention is characterized in that the rotatable drum structure comprises several horizontaly superposed series, for example eight in number, of radially extending cells, each of said series comprising a very large number, for example 60, of cells uniformly distributed around the axis of the drum, with the cells of the said superposed series being in vertical alignment and each cell being intended to receive a magazine containing a supply of blanks of the same type, and in that there is provided an electric motor and an associated magnetic brake, the drum structure comprising a central axially extending aperture in which an ejector device associated to each of said series of cells is mounted on a fixed support, all the ejectors being disposed in a same diametral plane of the drum structure, and in that there is provided a control panel having a number of slots for introduction of specimen keys corresponding to the number of cells of the drum structure, the slots being arranged in groups each of which has a number of slots corresponding to the number of said superposed series of cells, and means, actuatable by insertion of a specimen key, being provided to effect closing the motor circuit to drive the motor, and in that there is associated to each of said superposed series of cells a cam for operating a limit switch when the cell containing a desired blank comes in front of the plane of the ejectors, said limit switch being inserted in a circuit to interrupt through a relay the supply of current to the motor and to energize the magnetic brake and furthermore to operate, through a relay, the ejector corresponding to the selected one of the said superposed series of cells.

BRIEF DESCRIPTION OF THE DRAWINGS

In the accompany drawings which are given by way of example.

DETAILED DESCRIPTION

Figure 1:
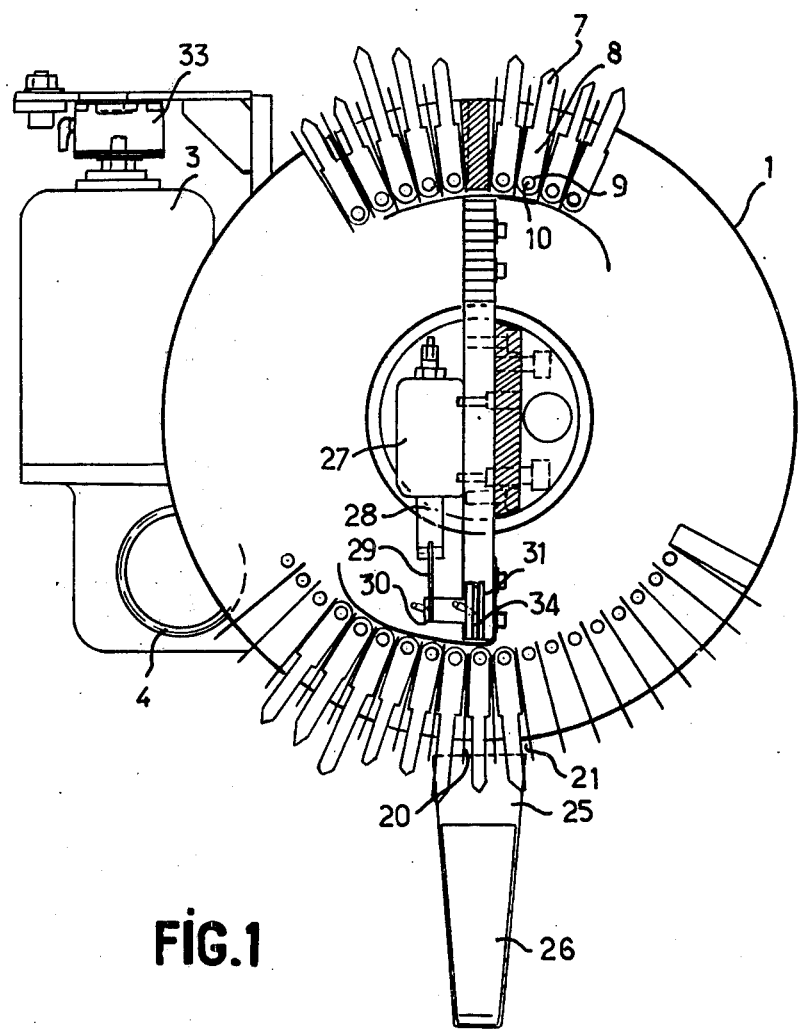
FIG. 1 shows a transverse cross-sectional of the drum structure at the level of one of the superposed series of cells.
Figure 2:
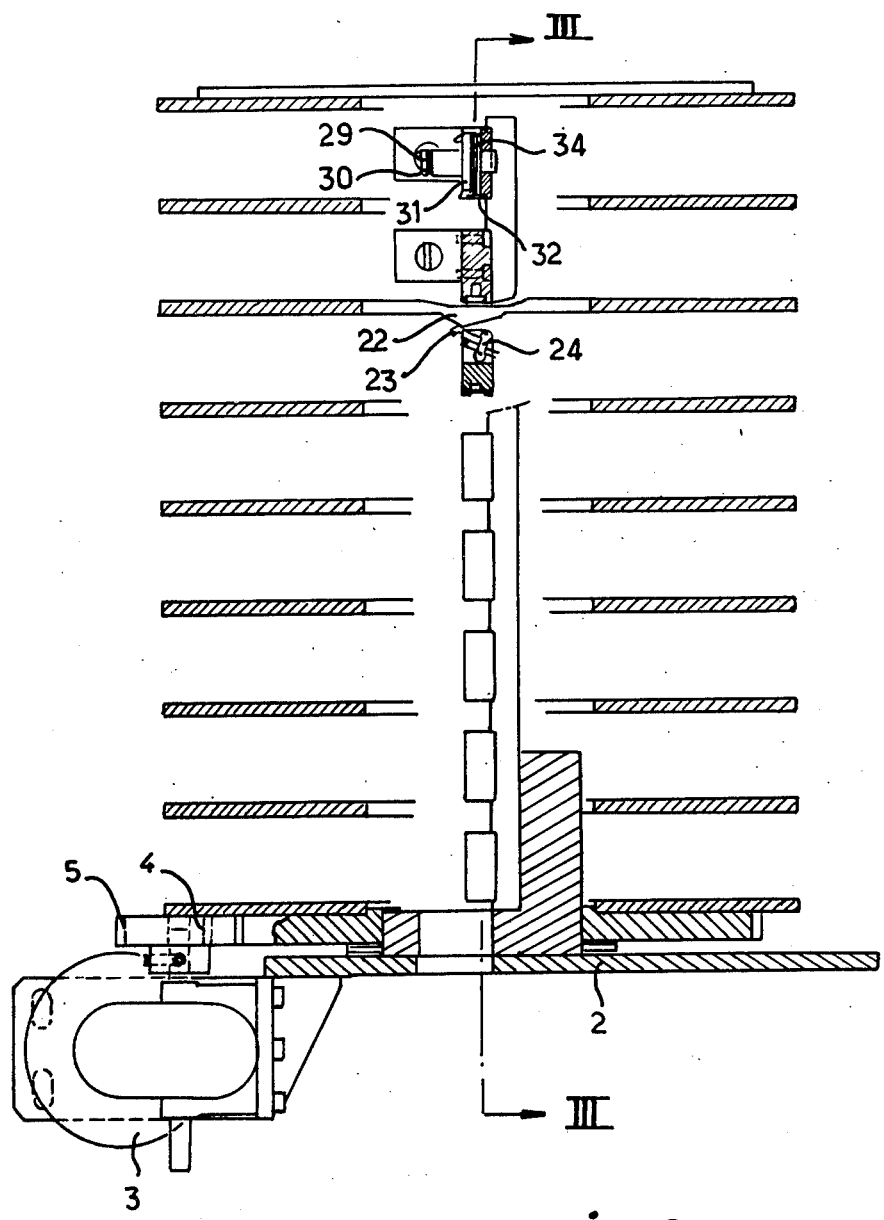
FIG. 2 is an axial section on a plane at right-angle to the plane of the section in FIG. 1.
Figure 3:
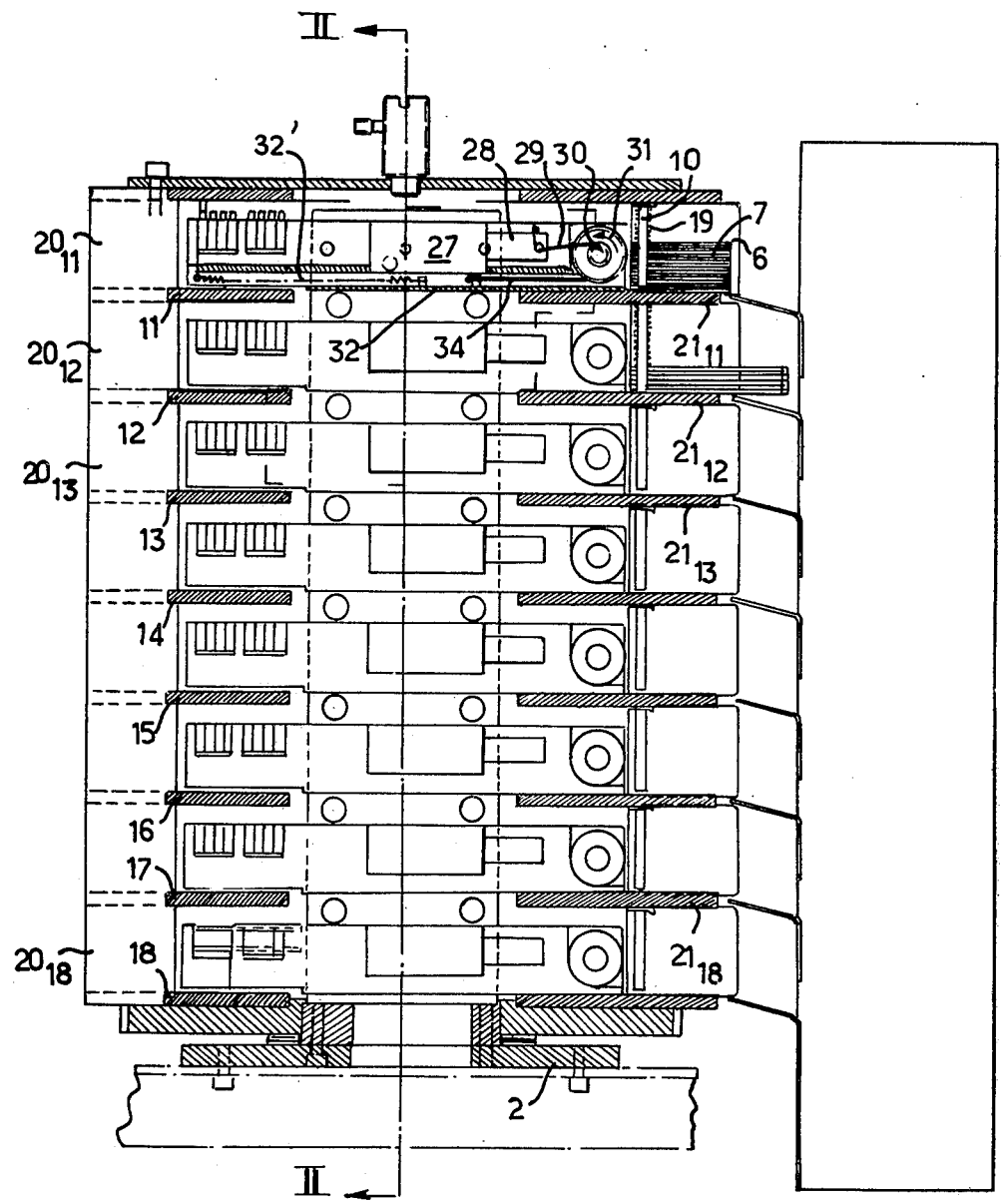
FIG. 3 is a section along line III—III of FIG. 2.

The rotatable drum structure shown in FIGS. 1 to 3 consists of a vertical cylinder 1, which has a central axially extending aperture, and which is supported by a base plate 2; the drum structure is capable of being rotated by means of a geared electrical motor 3, the driven pinion 4 of which meshes with a gear wheel 5 integral with cylinder 1 just above the said base plate. An electromagnetic brake 33 which makes it possible to block the motor 3 when its supply is cut off is associated to the shaft of this motor. The cylinder 1 is formed by an assembly comprising a plurality of superposed rings, for example eight in number, such as rings 11, 12, 13, 14, 15, 16, 17 and 18 each having on its periphery a very large number, for example 60, of juxtaposed cells such as $20_{11}$, $20_{12}$...$20_{18}$, $21_{11}$, $21_{12}$...$21_{18}$, etc., the cells bearing the same reference number as the reference index of the corresponding ring being disposed on the same generatrix of the cylinder. Disposed in each cell is a magazine consisting of a case 6 (FIG. 3), in the shape of an inverted U open at the back and at the bottom, and in which key blanks are stacked, a different model being stacked in each cell. These flat key blanks are constituted as shown in FIG. 1 by a flat shank 7 and a relatively narrow head perforated at 9, these blanks being subsequently associated, before or after cutting of the profile, with a separate operating head, for example of plastics material. On the upper wall of each case 6, that is to say on the base of the inverted U, there is fixed a rod 10 of sufficient length to be engaged in the holes 9 of all the blanks 7 contained in the magazine, except for the lowest one which rests directly on the bottom of the corresponding cell. A spring 19 is engaged over the rod 10 pushing all these blanks downwardly so that after the blank occupying the lowest position has been ejected by means which will be described hereinafter, the following blank will take its place.

On the underside of each of the rings 11 to 18 there is a cam such as 22, each cam being capable of actuating the nose 23 of the movable contact of a limit switch 24 corresponding to a vertical row of cells. The switches 24 are mounted on a central fixed support disposed in the central aperture of the drum structure, each of these switches is operated by its associated cam in order instantly to stop the motor driving the drum 1 when, during rotation of the drum, the vertical row of cells containing the selected cell is brough in the diametral plane containing the ejector means which bring about ejection of the blank onto one of the plates forming inclined surfaces $25_{11}$, $25_{12}$, $25_{13}$ ... $25_{18}$ directing the ejected blank to a receptacle 26 (FIG. 1).

It is to be understood that the cams and/or their associated limit switches are angularly shifted with respect to each other to be able to stop the drum structure with a selected vertical row of cells in front of the ejectors. Thus, the limit switches may be vertically aligned and the cams angularly shifted with respect to each other for an angle which corresponds to the angularly distance between two adjacent cells lying in a same horizontal plane. But a reverse arrangement may also be adopted.

Mounted on the central fixed support disposed in the central aperture of the cylinder structure, there are ejector means, one per superposed levels or series of cells uniformly distributed around the axis of the drum, each comprising an electromagnet 27 (FIGS. 1 to 3) which is energized at the moment when the selected cell stops in the vertical plane in which all the ejector electromagnets are located, in front of the delivery plates 25. Each of the electromagnets comprises a movable member 28 which is attracted when the electromagnet is energized and connected by a very short cable 29 to a return device mounted on the fixed support and comprising a small pulley 30 which this cable causes to turn and a larger pulley 31 on which is wound a longer cable 34 attached to a steel tongue 32 guided in a swallowtail slide and penetrating the cell which has stopped opposite the electromagnet in order to eject therefrom the blank 7 resting on the bottom of the cell and which is not retained by the rod 9 of the corresponding magazine 6. A return spring restores the tongue 32 to its initial position after ejection of the blank. By virtue of this return, the stroke of the tongue is longer than that of the armature of the electromagnet which makes it possible to reduce the bulk of the latter and at the same time to achieve a shorter operating time. It will be seen hereinafter that in order to obtain a very rapid operation of the ejector electromagnets which impart a very abrupt movement to the ejector tongue 32, the ejector electromagnet is energized by a brief high intensity pulse produced by the discharge of a previously charged capacitor.

The principle of selection of the cell containing the blanks corresponding to a specimen key which is to be reproduced will now be explained.

Figure 4:
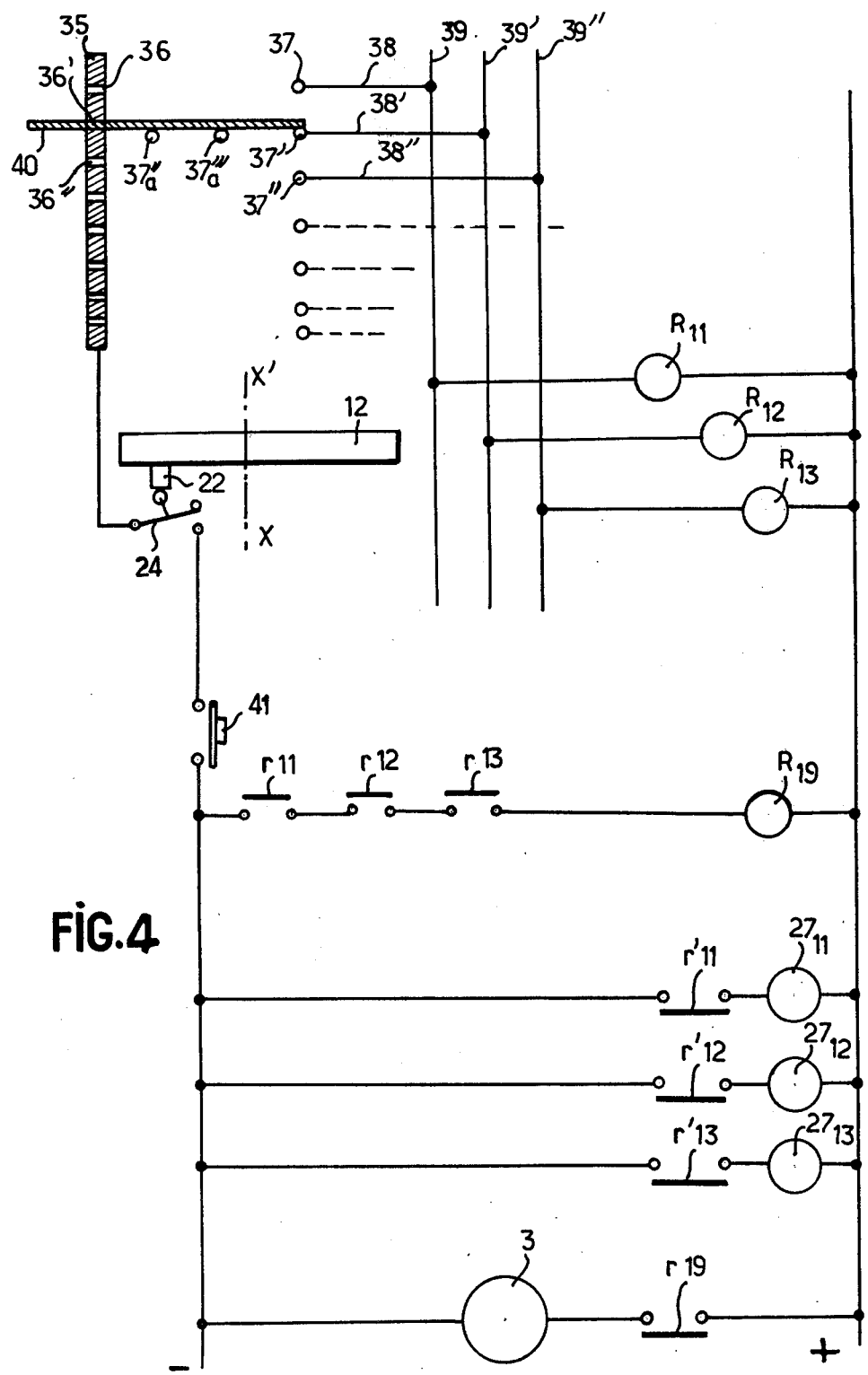
FIG. 4 is a simplified wiring diagram showing the principle of operation of the dispenser.

As illustrated in the simplified diagram in FIG. 4, there is associated to the dispenser a control panel not shown but arranged as will be described with FIG. 5, which panel comprises a number of template members 35 corresponding to the number of cells per level of the structure drum, in other words 60 in the example chosen. Disposed in each plate 35 are slots equal in number to that of the stages of the drum, in other words eight in the example chosen, the slots 36, 36', 36" on each plate 35 having in cross-section a form corresponding respectively to that of the blanks contained in the eight cells which are in vertical alignment that is disposed along the same generatrix of the drum. The template members are made of an electrical conducting material, and introduction of the specimen key 40 into one of the slots has the effect of making an electrical connection between this plate and one of the terminals 37, 37', 37" ... disposed behind the plate and respectively connected by eight horizontal conductors 38, 38', of which only three are shown in FIG. 4, to eight vertical conductors, 39, 39', 39" ... of which only three are shown.

The conductors 39, 39', 39" ... are respectively connected to the windings of eight level or stage relays R 11, R 12, R 13 ... which are mounted in parallel on the supply circuit. The supply circuit is thus closed by insertion of the specimen key 40 into the template and monitored furthermore by the limit switch 24, which is normally closed, on the ring 12 of the stage in which is contained the cell containing the blanks corresponding to the slot 36' into which the key 40 has been inserted. Mounted in the circuit which is thus monitored by the specimen key and the limit switch 24 is a push button switch 41 controlling operation of the motor via the winding of the relay R 19 mounted in series with the armatures r 11, r 12, r 13 ... of the stage relays R11 to R18. Other armatures r'11, r'12, r'13 ... of the stage relays are mounted respectively in series with the ejector electromagnets $27_{11}$, $27_{12}$ ... disposed in the corresponding stages 11 to 18.

The dispenser according to the simplified diagram functions as follows:

Insertion of the specimen key 40 into the slot 36' prepares the supply circuit of relay R12 of the corresponding level of cells, which circuit is completed by manually pushing push-button 41 in its operating position, thus causing energization of the motor 3 with the result that the drum 1 is rotated about its axis. When the ring 12 arrives in the position in which the vertical row of cells including the cell containing the blanks corresponding to the specimen key 40 is in front of the vertical row of ejectors, the cam 22 associated to the ring 12 effects opening of the limit switch 34. The relay R12 is de-energized and its armature r12 opens and causes de-energizing of the relay 19 which cuts the supply to the motor so that the drum stops in the selected angular position the brake 33 blocking the rotor of motor 3. At the same time, the armature r'12 closes the circuit of electromagnet $27_{12}$ of the corresponding level or superposed series of cells and actuates the ejector so that a blank corresponding to the specimen key 40 is passed into the receptacle 26.

Figure 5:
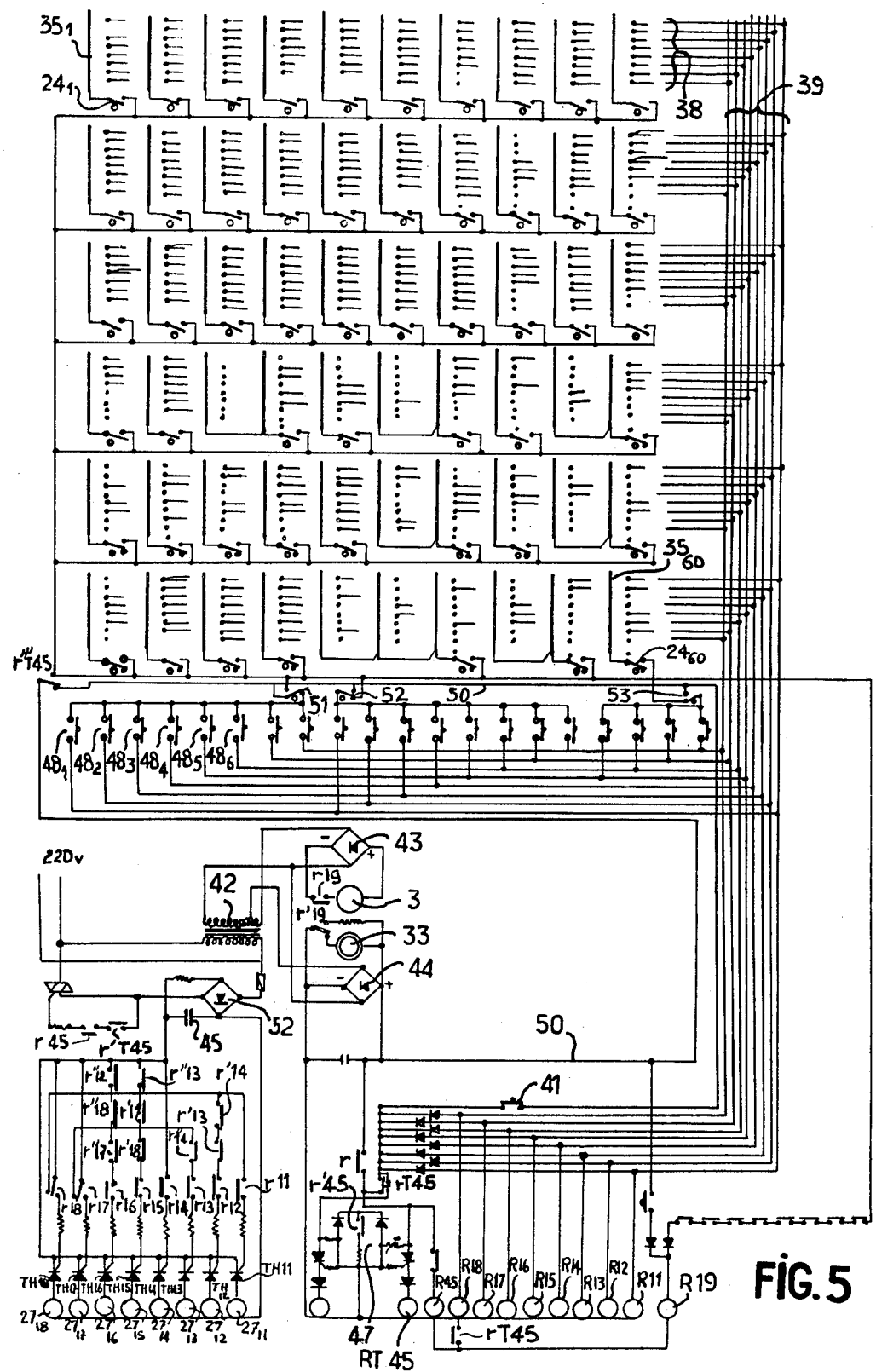
FIG. 5 shows the complete wiring diagram.

FIG. 5 shows the complete wiring diagram of the dispenser comprising 60 templates $35_1$ to $35_{60}$ disposed, in order to reduce the overall height of the control panel, in six columns each containing templates and each plate, like the plate 35 in the diagram in FIG. 4, offering eight slots corresponding to eight vertically aligned cells of the superposed series of cells.

As an alternative to the simplified diagram of FIG. 4, the push-button 41 controlling the supply of motor 3 is disposed in an alternating current supply circuit of for example 220 volts. The supply circuit includes a transformer 42 having multiple tappings and a rectifier bridge 43 providing for example a direct current of 35 volts, while a rectifier bridge 44 is supplying a direct current of for example 24 volts to the magnetic brake 33 and to the various relays referred to hereinabove. When energized, the armature r19 of the relay 19 closes the circuit of the motor and, when it is de-energized, it closes the circuit of the brake 33 through its armature r'19 to stop the drum in the selected angular position. The main source of a.c. supplies directly the charging circuit of the capacitor 45 which is intended to provide the control pulse for the ejector electromagnets $27_{11}$ ... $27_{18}$ at the time of discharge. This discharge occurs through armatures r'11 to r'12 of relays R 11 to R 12 as indicated above and via thyristors TH 11 to TH 18. The charging and discharging of the capacitor is controlled respectively by the armature r'45 of a charging relay R 45 and by the armature r'46 of a relay RT 45 which is time controlled by a timing circuit 47, the time lag relay RT 45 likewise controlling through its armature r T 45 the relay R 19 which starts and stops the motor 3.

It frequently happens that the keys of one and the same manufacturer have identical cross-sections so that they can therefore be introduced into a same slot of the template, but are of different lengths. Nevertheless, in order that the shorter keys may close the circuit of the relay R corresponding to the cell containing the corresponding blanks, while on the other hand the longer keys of the same cross-section cannot close the circuit of the relays corresponding to the shorter blanks, the key blanks of different lengths and of the same cross-section are distributed over cells situated on different levels. In order to achieve this result, the templates 35 comprise as shown in FIG. 4, behind the slot 36' corresponding to the cross-section of keys of different lengths, supplementary terminals 37a'' and 37a'''. It will be assumed for example that the terminal 37' corresponds to the longest length of key and that the corresponding blanks are contained in a cell of the cell level controlled by relay R 14. Nevertheless, introduction of the specimen key at the same time completes the circuits of the terminals 37'' and 37''' which corresponds to cells situated in the stages or levels referenced 13 and 14. In order to prevent the shortest or medium length blank being selected when the longest specimen key is inserted, the relays R 13 and R 14 comprise supplementary armatures r'13 and r'14 mounted in series with the armature r 12 of the relay R 12 and which are mounted in such a way as to lock the circuit of the ejector $27_{12}$ when the desired blank corresponds to the stage of the relay R 13 or R 14 and reciprocally a supplementary armature r''14 being mounted in series with the armature r13 of the ejector electromagnet $27_{13}$, so that only the armature r14 of the relay R 14 produces operation of the electro-ejector $27_{14}$.

The dispenser likewise comprises a direct manual control which makes it possible to select the blanks corresponding to the most current specimen keys which the operator knows by heart. In this case, instead of operating the drum by inserting the specimen key into one of the templates 35, the operator actuates one of the push button switches $48_1$, $48_2$, $48_3$, $48_3$ ... which via horizontal conductors 49, 49', 49'' respectively connected to the vertical conductors 39', 39'', 39''' ... close the circuits of the stage relays $R_{11}$ to $R_{18}$, these push buttons being moreover connected to a conductor 50 controlled by a supplementary armature r''' T 45 of the time delay relay RT 45. These push buttons 48 are associated with limit switches 51 connected to limit switches on the templates in which the blanks to be selected are located, so that the operation of the apparatus based on actuation of the push buttons 48 is the same as that which has been described above.

What is claimed is:

1. In an apparatus for automatic selecting and dispensing a key blank corresponding to a specimen key to be reproduced having a rotatable drum structure (1)

radial cells (20) in each of which stacked blanks of the same model can be located provided in said drum structure;

and ejector means (27, 28, 32) for ejecting a blank opposite to which a cell, containing blanks of the selected type has been moved by a rotary movement of the drum structure controlled by insertion of a specimen key (40) to be reproduced into a template (35) formed with at least one slot (36) having, in cross-section, a form identical to that of the specimen key, wherein in accordance with the invention, a number of superposed series of cells (20) are uniformly distributed on the periphery, of said drum structure (1), the cells of said series of cells being in vertical alignment, and each cell being capable to store a magazine (6) containing a supply of key blanks (7, 8) of a same type;

an electric motor (3) is provided connected to rotate the drum; and a magnetic brake (33) is provided for blocking the motor when the drum has reached a preselected position;

said drum structure being formed with a central axially extending aperture;

a fixed support located within said aperture of the drum, the ejector means (27, 28, 32) being carried by said support and including one ejector device provided for each of said superposed series of cells, all ejector devices being disposed in a same diametrial plane of the drum; said template including a control panel strip (35), the number of slots (36) in said strip corresponding to the total number of cells, for introduction of specimen keys (40), said slots being arranged in groups each of which have the number of slots corresponding to the number of superposed series of cells;

means (37) controlled by insertion of a specimen key in a slot for establishing power supply to the motor circuit to start the motor (3), cam means (22) associated with each of said superposed series of cells, a cam operated switch (24) associated with each of said cam means to coact therewith when a selected cell containing a desired blank is brought in front of the ejector devices, and a relay controlled circuit means in which said switch is inserted for cutting off the motor (3), for operating the magnetic brake (33) and for operating the ejector means (27, 28, 32) corresponding to the selected one of said superposed series of cells.

2. Apparatus according to claim 1, wherein an individual cam is fixedly associated with each of the rings and radially associated with the radial position of a cell which during rotation of the drum passes over the cam operated switches (24) corresponding respectively to the cells, each switch controlling a circuit closed by introduction of a specimen key into the corresponding slot in the control panel; the relay controlled circuit means respectively containing the windings of relays of cells of which the armatures controls the triggering of the ejector device and the winding of a relay controlling the circuit of the motor and the brake.

3. Apparatus according to claim 2, wherein each ejector device comprises an electromagnet having a movable armature cable controlled by the armature, and a steel tongue operated by said cable which has a thickness slightly less than that of a blank, said tongue being guided in the support for the electromagnet for acting on a key blank which is situated at the bottom of a pile of key blanks contained in a magazine contained in a cell.

4. Apparatus according to claim 3, wherein the magazines contained in the cells comprise a box open at the rear and at the back, and a vertical rod of sufficient length to engage in holes provided in the heads of a stack of blanks, and a spring urging the blanks towards the bottom of the cell, the rod stopping short of the lowest blank in the stack to permit ejection by the electromagnet.

5. Apparatus according to claim 3, wherein
circuit means are provided to connect the windings of the ejector electromagnets at the moment of their operation to receive the discharge of a capacitor;
a charge circuit for the capacitor including a multitapped transformer;
a rectifier bridge; a resistor;
and a timing relay, to control the circuit of the motor and of the brake.

6. Apparatus according to claim 5, wherein the relay controlled circuit means includes relay switch means respectively connected in the circuit controlled by the cam operated switches of the corresponding cells and further connected in series with a relay controlling the circuit of the motor and the brake, and controlling the discharge of the capacitor of the corresponding ejector.

7. Apparatus according to claim 2, wherein the template formed with the slots for introduction of specimen keys corresponding to the superposed series of cells, which are contained in respective radial planes of the drum structure, comprises a plurality of conductive plates connected to a corresponding cam operated switch and wherein the end of a specimen key which is, in use, introduced therein connects a plate to one of a selected terminal, for selection of an individual cell.

8. Apparatus according to claim 5, wherein in the event of there being blanks of the same cross-section but of different lengths, the plates, in which are located slots having a form identical to this cross-section, comprise a plurality of terminals situated at different distances from the plate and corresponding to the different lengths of blanks of same cross-section, said terminals being respectively connected to the conductors feeding the ejector means of the series of cells in which these blanks of different lengths are respectively located, and relays controlling the discharge of the capacitor in the circuits of the ejector electromagnets, and comprising at least one supplementary armature disposed in series thereas and mounted to cut the supply circuit of the ejecting magnets not corresponding to the desired length of blank when the capacitor is discharged.

9. Apparatus according to claim 3, wherein the armature of each ejecting device controls the steel tongue for acting on a blank to be ejected by means of a return device comprising a cable attached to the said armature for operating a smaller pulley which is rigidly rotatable with a second pulley operating the tongue through another cable, the diameter of this second pulley being greater than that of the first, smaller pulley whereby the stroke of the tongue is increased with respect to that of the armature of the electromagnet; and return means are provided for returning the armature and the tongue to their initial positions.

10. An apparatus for automatically selecting and dispensing a key blank corresponding to a specimen key to be reproduced, comprising
a cylindrical rotatable drum (1) having a central axially extending aperture, said drum being rotatable about a fixed support located with said aperture, said drum being composed of a number of superposed rings defining individual radially-located cells (20) each cell being capable of storing a dispensing magazine (6) containing one or more identical key blanks (7, 8);
an ejector means (27, 28, 32) for ejecting a key blank from said dispensing magazine, said ejector means being fixedly located within said aperture of said drum and including individual ejector devices, at least one of said ejector devices being provided for each superposed ring of cells;
a drive means (3) coupled to said rotatable drum for rotating said rotatable drum relative to said fixed ejector means;
a braking means (32) coupled to said drive means, for quickly stopping rotation of the drum when the drum has reached a predetermined position; and
a control means including a key pattern sensing means (35, 36, 37) electrically connected to said drive means, brake means and ejector means, which upon insertion of the specimen key, activates the drive means in accordance with the sensed pattern to selectively rotate said drum until the cell containing the required key blanks is aligned with the corresponding ejector device of said ring of cells, said control means being connected to deactivate the drive means and activate the braking means thereby stopping the predetermined cell in aligned position with said ejector device, and, uponactivation of said ejector device ejecting a key blank from said cell.

11. The apparatus of claim 10, wherein said key pattern sensing means comprises a plurality of template slots corresponding in number to the number of cells contained in said drum, said slots each having a unique cross-sectional area.

12. The apparatus of claim 1, wherein said slots are arranged in groups corresponding in number and position to said vertically aligned cells.

13. The apparatus of claim 10, wherein the cells of series are vertically aligned with cells of the superposed rings of cells.

14. The apparatus of claim 10, wherein said control means comprises a separate cam means for each of said vertically aligned cells and radially uniquely associated with axially aligned cells, and a switch associated with each of said cam means for de-energizing the drive means, energizing the brake means, and energizing the ejector means when a selected cell containing the desired blank is aligned with the ejector device.

15. Apparatus according to claim 10, wherein each of said superimposed rings include a cam means, the respective cam means of the respective rings being radially shifted with respect to each other, and facing the central apperture;

a series of cam-operated switches, axially disposed within said drum and respectively actuated upon passage of a respective cam means passed one of the switches, upon rotation of the drum, to control the angular position of the drum by matching actuation of one of said switches with a key-pattern sensed by the sensing means, said sensing means additionally associating a selected one of said axially aligned rings with the radially determined position by the specific selected cam and switch combination, to uniquely identify a specific cell and permit control of ejection of a blank from the uniquely identified cell.

* * * * *

UNITED STATES PATENT AND TRADEMARK OFFICE
CERTIFICATE OF CORRECTION

PATENT NO. : 4,159,783
DATED : July 3, 1979
INVENTOR(S) : Serge CRASNIANSKI

It is certified that error appears in the above-identified patent and that said Letters Patent are hereby corrected as shown below:

Claim 12, column 8, line 56, change "1" to -- 11 --

Signed and Sealed this

*First* Day of *January 1980*

[SEAL]

*Attest:*

SIDNEY A. DIAMOND

*Attesting Officer*     *Commissioner of Patents and Trademarks*